United States Patent
Egger et al.

(10) Patent No.: US 8,555,005 B2
(45) Date of Patent: Oct. 8, 2013

(54) MEMORY MANAGING APPARATUS AND METHOD USING A POINTER INDICATOR BIT TO PERFORM GARBAGE COLLECTION

(75) Inventors: Bernhard Egger, Seoul (KR); Tai-Song Jin, Seoul (KR); Dong-Hoon Yoo, Seoul (KR); Won-Sub Kim, Anyang-si (KR); Sun-Hwa Kim, Seoul (KR); Hee-Jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 12/917,173

(22) Filed: Nov. 1, 2010

(65) Prior Publication Data

US 2011/0231627 A1    Sep. 22, 2011

(30) Foreign Application Priority Data

Mar. 22, 2010  (KR) .................. 10-2010-0025353

(51) Int. Cl.
*G06F 12/00*      (2006.01)

(52) U.S. Cl.
USPC ............................................ 711/154; 711/165

(58) Field of Classification Search
USPC ........................................ 711/154, 165, 170
See application file for complete search history.

(56) References Cited

U.S. PATENT DOCUMENTS

| | | | |
|---|---|---|---|
| 5,560,003 A | 9/1996 | Nilsen et al. | |
| 5,799,185 A * | 8/1998 | Watanabe | ............................. 1/1 |
| 5,903,900 A | 5/1999 | Knippel et al. | |
| 6,301,646 B1 | 10/2001 | Hostetter | |
| 7,251,671 B2 | 7/2007 | Wu et al. | |
| 7,765,244 B2 * | 7/2010 | Rajakarunanayake | ........ 707/823 |
| 2009/0019079 A1 * | 1/2009 | Persson | .................... 707/103 R |

* cited by examiner

*Primary Examiner* — John Lane
(74) *Attorney, Agent, or Firm* — NSIP Law (57) ABSTRACT

A memory managing apparatus and method are provided. The memory managing apparatus may determine, based on a pointer indicator bit, the target memory area on which garbage collection is to be performed, and may perform the garbage collection on the target memory area. The memory managing apparatus may generate the pointer indicator bit and store the generated pointer indicator bit in a pointer field.

16 Claims, 6 Drawing Sheets

| 510 | 0 | 0 | 0 | 0 | 1 | 511 |
|     | 1 | 0 | 1 | 0 | 0 |     |
| 520 | 1 | 0 | 0 | 0 | 1 | 521 |

FIG. 6

MEMORY MANAGING APPARATUS AND METHOD USING A POINTER INDICATOR BIT TO PERFORM GARBAGE COLLECTION

CROSS-REFERENCE TO RELATED APPLICATION(S)

This application claims the benefit under 35 U.S.C. §119(a) of Korean Patent Application No. 10-2010-0025353, filed on Mar. 22, 2010, in the Korean Intellectual Property Office, the entire disclosure of which is incorporated herein by reference for all purposes.

BACKGROUND

1. Field

The following description relates to a memory management technology for garbage collection.

2. Description of the Related Art

A memory managing apparatus searches for available memory in response to a memory is allocation request, and allocates the found memory according to the request. The allocated memory may be used for running a particular program. The program may not explicitly inform the memory managing apparatus of the completion of a job involved in the allocated memory. Instead, a garbage collector may perform garbage collection on a regular basis, e.g., periodically or at predetermined times, to release unused allocated memory.

For example, the garbage collector may determine whether an allocated memory is in use to run a program. If an entity involved with the program does not refer to the allocated memory, the garbage collector may release the allocated memory. Consequently, the released memory may be allocated to another program.

However, the garbage collector may still release a memory that is currently in use. Thus, a garbage collector is desired to accurately determine whether an allocated memory is currently being used or not.

SUMMARY

In one general aspect, there is provided a memory managing apparatus, including: a register including a pointer field configured to store: a pointer indicator bit, and a data field configured to store data, and a determining unit configured to determine, based on the pointer indicator bit, a target memory area on which garbage collection is to be performed.

In the memory managing apparatus, the determining unit may be further configured to: determine, based on the pointer indicator bit, whether the data stored in the data field is a pointer, and in response to the data stored in the data field being a pointer, determine a memory area corresponding to the pointer as the target memory area.

The memory managing apparatus may further include an executing unit configured to perform garbage collection on the target memory area.

In the memory managing apparatus, the executing unit may be further configured to: determine whether the target memory area is in use, and in response to the target memory area not being in use, release allocation of the target memory area.

In another general aspect, there is provided a memory managing apparatus, including: a register including a pointer field configured to store: a pointer indicator bit, and a data field configured to store data, and a generating unit configured to: generate the pointer indicator bit, and store the generated pointer indicator bit in the pointer field.

In the memory managing apparatus, in response to at least one of two pieces of data being a pointer and an operation being performed on the two pieces of data to generate a single piece of output data, the generating unit may be further configured to determine the output data as a pointer.

In the memory managing apparatus, the generating unit may be further configured to generate a pointer indicator bit to indicate that the output data is a pointer.

In the memory managing apparatus, the generating unit may be further configured to generate the pointer indicator bit based on an instruction for setting a pointer.

In the memory managing apparatus, the instruction may include at least one of: an instruction for reading data to be set as a pointer and storing the read data in the data field, and an instruction for setting the data stored in the data field as a pointer.

In another general aspect, there is provided a memory managing method, including: generating a pointer indicator bit, storing the generated pointer indicator bit in a pointer field, and determining, based on the pointer indicator bit, a target memory area on which garbage collection is to be performed.

In the memory managing method, the generating and storing of the generated pointer indicator bit may include: in response to at least one of two pieces of data being a pointer and an operation being performed on the two pieces of data to generate a single piece of output data, determining the output data as being a pointer, and generating the pointer indicator bit to indicate that the output data is a pointer.

In the memory managing method, the generating and storing of the generated pointer indicator bit may include generating the pointer indicator bit based on an instruction for setting a pointer.

In the memory managing method, the instruction may include at least one of: an instruction for reading data to be set as a pointer and storing the read data in the data field, and an instruction for setting the data stored in the data field as a pointer.

In the memory managing method, the determining of the target memory area may include: determining, based on the pointer indicator bit, whether the data stored in the data field is a pointer, and in response to the stored data being a pointer, setting a memory area corresponding to the pointer as the target memory area.

The memory managing method may further include performing garbage collection on the target memory area.

A computer-readable information storage medium may store a program for causing a computer to implement the method.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
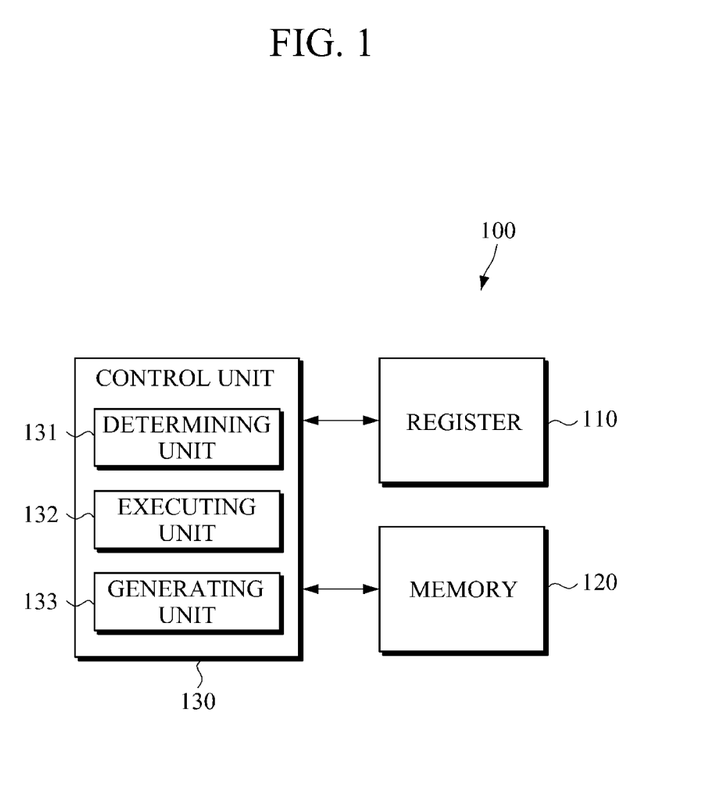
FIG. 1 is a diagram illustrating an example of a memory managing apparatus.

FIG. 1 illustrates an example of a memory managing apparatus. Referring to the example illustrated in FIG. 1, the memory managing apparatus 100 may include a register 110, a memory 120, and a control unit 130.

The register 110 may store an instruction or an operation result, or may read data from the memory 120 which may store programs.

The register 110 may include a pointer field and a data field. The pointer field may store a pointer indicator bit, and the data field may store data. For example, the pointer indicator bit may indicate whether the data stored in the data field is a pointer or not. Examples of the structures of the pointer field and the data field are further described below with reference to the example in FIG. 2.

The memory 120 may store data used to run the memory managing apparatus 100. The memory 120 may be divided into a plurality of areas including a code area, a data area, a heap area, and a stack area.

The code area is a memory area for storing a code itself, and may store an instruction of an application program.

The data area is a memory area for storing data, and may store a global variable, a static variable, and/or other various arrays and data structures.

The heap area is a memory area that is allocated by a programmer in person. The heap area may be generated by dynamic allocation. For example, if memory allocation is requested during running a program, the control unit 130 may allocate a part of the heap area.

The stack area is a memory area for storing a local variable and a medium variable which are created when a function is invoked. The variables stored in the stack area may disappear when the function invocation is terminated. For example, the stack area may store an automatic variable or a return address.

With further reference to the example in FIG. 1, the control unit 130 may include a determining unit 131, an executing unit 132, and a generating unit 133.

The determining unit 131 may determine a target memory area in which garbage collection is to be performed based on the pointer indicator bit. The target memory area may be the heap area. For example, the determining unit 131 may determine whether the data stored in the data field is a pointer based on the pointer indicator bit. If the data stored in the data field is a pointer, the determining unit 131 may determine a memory area corresponding to the pointer to be a target memory area.

The executing unit 132 may set the target memory area in which the garbage collection is to be executed based on a pointer included in any of a global variable, a local variable, and any other variables of the memory 120 and/or a pointer included in the register 110. For example, the executing unit 132 may recognize a memory area corresponding to a pointer included in the global variable as the target memory area, and execute the garbage collection with respect to the target memory area. In addition, the executing unit 132 may perform the garbage collection based on the pointer included in the local variable and/or the pointer included in the register 110.

The executing unit 132 may perform garbage collection with respect to the target memory area set according to the pointer indicator bit stored in the register 110. For example, the executing unit 132 may determine whether the target memory area is in use. If the target memory area is not in use, the executing unit 132 may release the allocation of the target memory area. If the target memory area is in use, the executing unit 132 may maintain the allocation of the target memory area.

The operations of executing the garbage collection using the determining unit 131 and the executing unit 132 are described further below with reference to the example in FIG. 2.

The generating unit 133 may generate the pointer indicator bit for indicating whether data is a pointer or not, and may store the generated pointer indicator bit in the pointer field of the register 110.

For example, if at least one of two pieces of data is a pointer and an operation is performed on the two pieces of data to generate output data, the generating unit 133 may determine the output data as a pointer. Then, the generating unit 133 may generate a pointer indicator bit that identifies that the output data is a pointer. The generating unit 133 may store the generated pointer indicator bit in the pointer field. The operation of the generating unit 133 is described further below with reference to the example in FIG. 3.

In another example, the generating unit 133 may generate the pointer indicator bit based on information of an instruction involved with a pointer. The generating unit 133 may store the generated pointer indicator bit in the pointer field. For example, an instruction may direct the control unit 130 to read data to be set as a pointer, and may store the read data as a pointer in the data field. Alternatively, an instruction may direct the control unit 130 to set data stored in the data field as a pointer. The above mentioned instructions are further described below with reference to the examples in FIGS. 4 and 5.

The memory managing apparatus 100 shown in the example illustrated in FIG. 1 may accurately determine, based on the pointer indicator bit, whether the data stored in the register 110 is a pointer, and may decide the exact target memory area in which garbage collection is to be performed.

In addition, the memory managing apparatus 100 may generate the pointer indicator bit and store the generated pointer indicator bit in the pointer field when storing the pointer in the register 110, and may accurately indicate whether data stored in the register 110 is a pointer or not.

Figure 2:
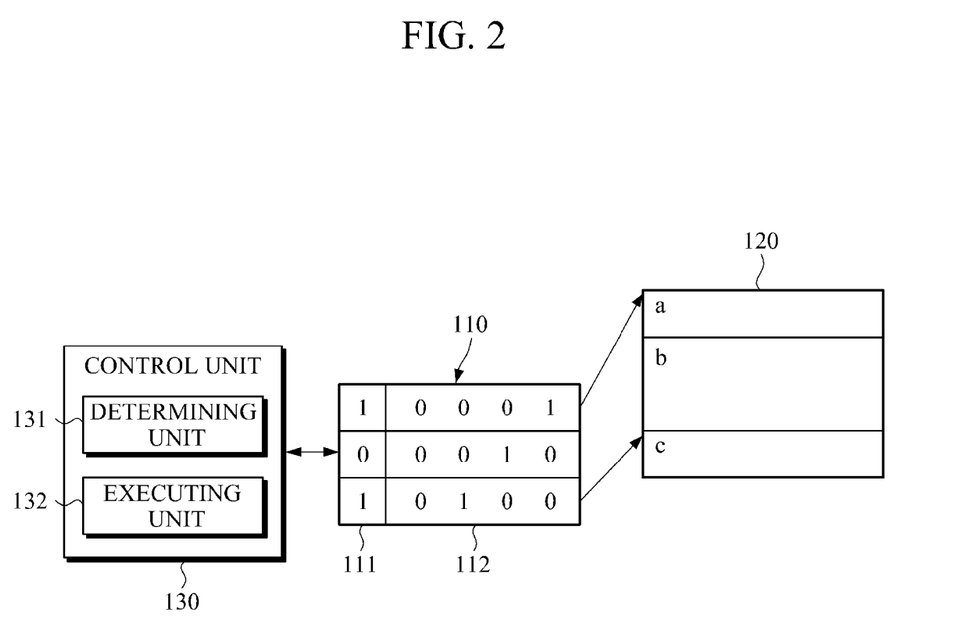
FIG. 2 is a diagram illustrating an example of a processor of a memory managing apparatus.

FIG. 2 illustrates an example of a processor of a memory managing apparatus. Referring to FIG. 2, a register 110 may include a pointer field 111 for storing a pointer indicator bit and a data field 112 for storing data. The register 110 may store three pieces of data, including first data, second data and third data. The first data may contain a pointer indicator bit "1" and a string of data bits "0001," the second data may contain a pointer indicator bit "0" and a string of data bits "0010," and the third data may contain a pointer indicator bit "1" and a string of data bits "0100." Although the string of data bits shown in the FIG. 2 example includes 4 bits in the example illustrated in FIG. 2, the number of data bits is not limited thereto. A pointer indicator bit of "1" indicates that the data stored in the data field is a pointer, and a pointer indicator bit of "0" indicates that the data stored in the data field is not a pointer. However, the pointer indicator bit "0" and "1" may alternatively be set to indicate the opposite.

The memory 120 may include three allocated memory areas a, b, and c. The number of allocated memory areas may be varied and is not limited to the example illustrated in FIG. 2. In one example, the first data is a pointer corresponding to the memory area a, and the third data is a pointer corresponding to the memory area c. The memory area b does not correspond to any pointer included in a register, but may correspond to a pointer included in a local variable or a global variable. Therefore, the memory area b may be set as a target for garbage collection.

A determining unit 131 may determine a target memory area in which garbage collection is to be performed based on the pointer indicator bit stored in the register 110. For example, the determining unit 131 may determine, based on the pointer indicator bit "1" of the first data, whether the data "0001" stored in the data field 110 is a pointer. In one example in which the pointer indicator bit is "1," the stored data "0001" is a pointer. The determining unit 131 may set the memory area a that corresponds to the pointer as a target memory area.

The determining unit 131 may determine, based on the pointer indicator bit "0" of the second data, whether the data "0010" stored in the data field is a pointer. In one example, as the pointer indicator bit is "0," the stored data "0010" is not a pointer.

The determining unit 131 may determine, based on the pointer indicator bit "1" of the third data, whether the data "0100" stored in the data field is a pointer. In one example in which the pointer indicator bit is "1," the data "0100" is a pointer. The determining unit 131 may set the memory area c which corresponds to the pointer as a target memory area.

The executing unit 132 may perform garbage collection on the target memory areas (the memory areas a and c) which have been set based on the pointer indicator bits stored in the register 110. For example, the executing unit 132 may determine whether the memory area a is in use. If the memory area a is not in use, the executing unit 132 may release the allocation of the target memory area such that it becomes available for reallocation. In contrast, if the target memory area is in use, the executing unit 132 may maintain the allocation of the target memory area. The executing unit 132 may perform garbage collection on the memory area c with the same procedures as performed on the memory area a. Consequently, a memory area which is not in use may be released, and thus unnecessary allocation of a memory area may be prevented.

The memory managing apparatus 100 may more accurately recognize whether the data stored in the register 110 is a pointer, based on the pointer indicator bit, and thus may determine an exact target memory area on which the garbage collection is to be performed. Thus, more efficient garbage collection may be realized.

Figure 3:
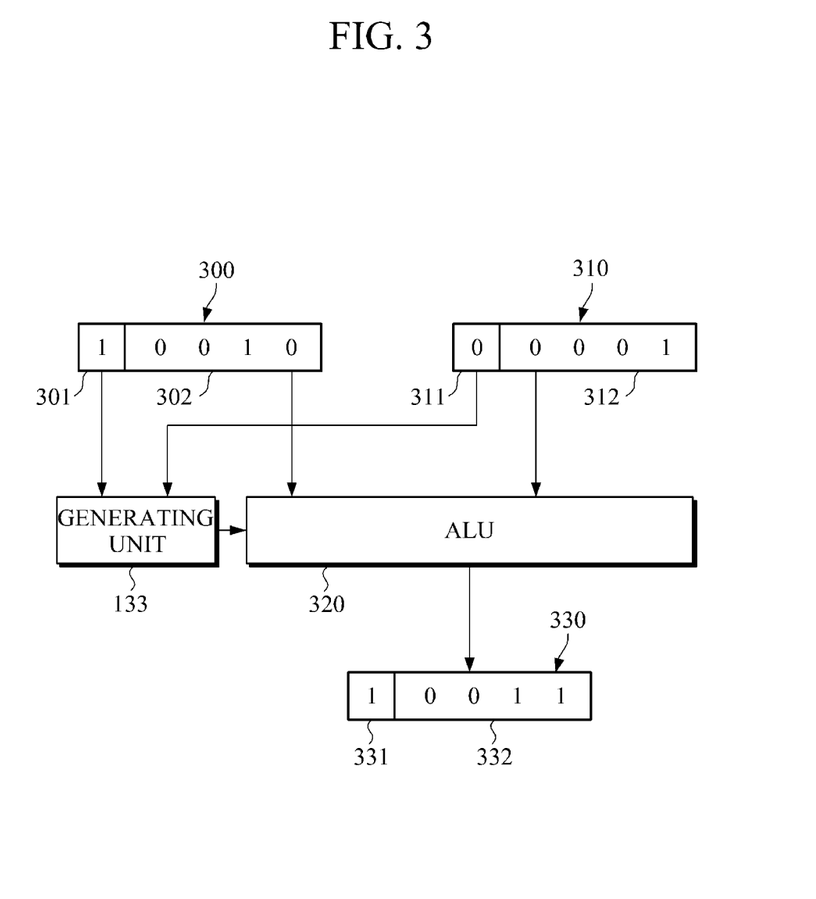
FIG. 3 is a diagram illustrating another example of a processor of a memory managing apparatus.

FIG. 3 illustrates another example of a processor of a memory managing apparatus. Referring to the examples illustrated in FIGS. 1 and 3, a first register 300 may include a pointer field 301 and a data field 302. In one example, the pointer field 301 may store a pointer indicator bit "1," and the data field 302 may store a string of data bits "0010." The pointer indicator bit "1" may indicate that data "0010" stored in the data field is a pointer. Although the data stored in the data field 302 is 4-bit data in the above example, the length of the data is not limited thereto.

Similar to the first register 300, a second register 310 may include a pointer field 311 and a data field 312. The pointer field 311 may store a pointer indicator bit "0," and the data field 312 may store a string of data bits "0001." The pointer indicator bit "0" may indicate that data "0001" stored in the data field 312 is not a pointer.

An arithmetic logic unit (ALU) 320 is a device for performing logic operations. The ALU 320 may perform an arithmetic operation such as addition and subtraction, and logic operations such as AND and OR.

The ALU 320 may add together pieces of data stored in the respective data fields 302, 312 to generate single output data. For example, the ALU 320 may add together the data "0010" stored in the data field 302 and the data "0001" stored in the data field 312 to output data "0011." The output data "0011" may be stored in a data field 332 of a third register 330.

The generating unit 133 may set the output data as a pointer when at least one of pieces of data are stored in the respective data fields 302 and 312. For example, as the data "0010" stored in the data field 302 is a pointer, the generating unit 133 may determine the output data "0011" as a pointer. The generating unit 133 may generate a pointer indicator bit "1," and may store the generated pointer indicator "1" in a pointer field 331 of the third register 330.

Figure 4:
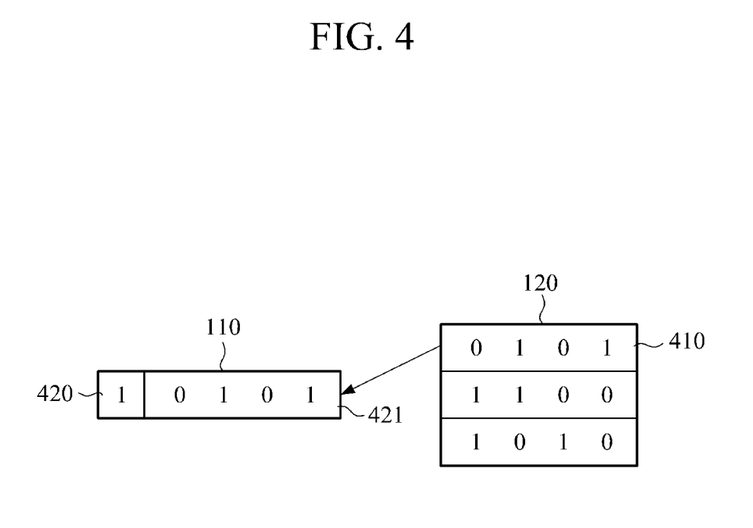
FIG. 4 is a diagram illustrating another example of a processor of a memory managing apparatus.

FIG. 4 illustrates another example of a processor of a memory managing apparatus. Referring to the examples illustrated in FIGS. 1 and 4, the memory 120 may store three pieces of data, including first data, second data, and third data. The first data 410 is "0101," the second data is "1100," and the third data is "1010."

The example illustrated in FIG. 4 is described under the presumption that the control unit 130 reads data to be set as a pointer from the memory 120 and stores the read data as a pointer in a data field 421 in response to an instruction.

The instruction may be represented as "load_pointer rs" in a programming language. According to the instruction, the control unit 130 may read data corresponding to rs from the memory 120, and may store the read data in the register 110 as a pointer. "rs" may refer to an address of data. A programmer may newly define the instruction.

For example, the control unit 130 may read the first data "0101" 410 from the memory 120. Then, the control unit 130 may store the read first data "0101" 410 in the data field 421 of the register 110. The read data may be stored as a pointer. At this time, the generating unit 133 may generate a pointer indicator bit "1" to indicate that the read data is a pointer. Then, the generating unit 133 may store the generated pointer indicator bit "1" in a pointer field 420 of the register 110. Accordingly, the read first data may be identified as a pointer.

Figure 5:
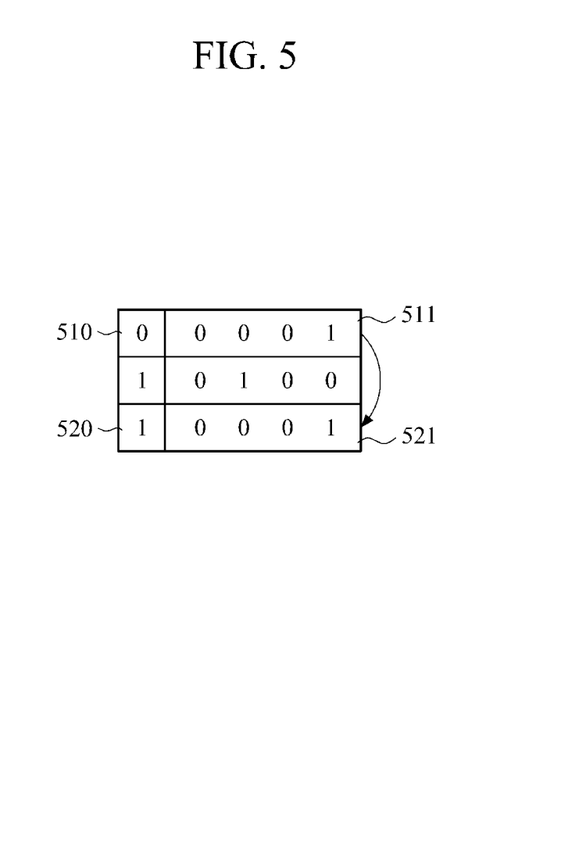
FIG. 5 is a diagram illustrating another example of a processor of a memory managing apparatus.

FIG. 5 illustrates another example of a processor of a memory managing apparatus. The example illustrated in FIG. 5 is described with reference to the examples FIGS. 1 and 4 under the presumption that the control unit 130 sets data stored in a data field as a pointer in response to an instruction.

The instruction may be represented as "Mov_pointer rd rs" in a programming language. According to the instruction, the control unit 130 may move data stored in rs to rd, and may set the moved data as a pointer. "rd" and "rs" may be addresses of data, and may be identical. A programmer may newly define the instruction.

For example, the control unit 130 may move data "0001" stored in a data field 511 to a data field 521, and may set the moved data "0001" as a pointer. At this time, the generating unit 133 may generate a pointer indicator bit "1" to indicate that the moved data is a pointer. Then, the generating unit 133 may store the generated pointer indicator bit "1" in a pointer field 520. Accordingly, the moved data may be identified as a pointer.

In one example, if rd and rs are the same as each other, the control unit 130 may set the data "0001" stored in the data field 511 as a pointer without moving. At this time, the generating unit 133 may generate a pointer indicator bit "1" to indicate that the data "0001" is a pointer. Then, the generating unit 133 may store the generated pointer indicator bit "1" in a pointer field 510. Accordingly, the existing data may be changed as a pointer.

Figure 6:
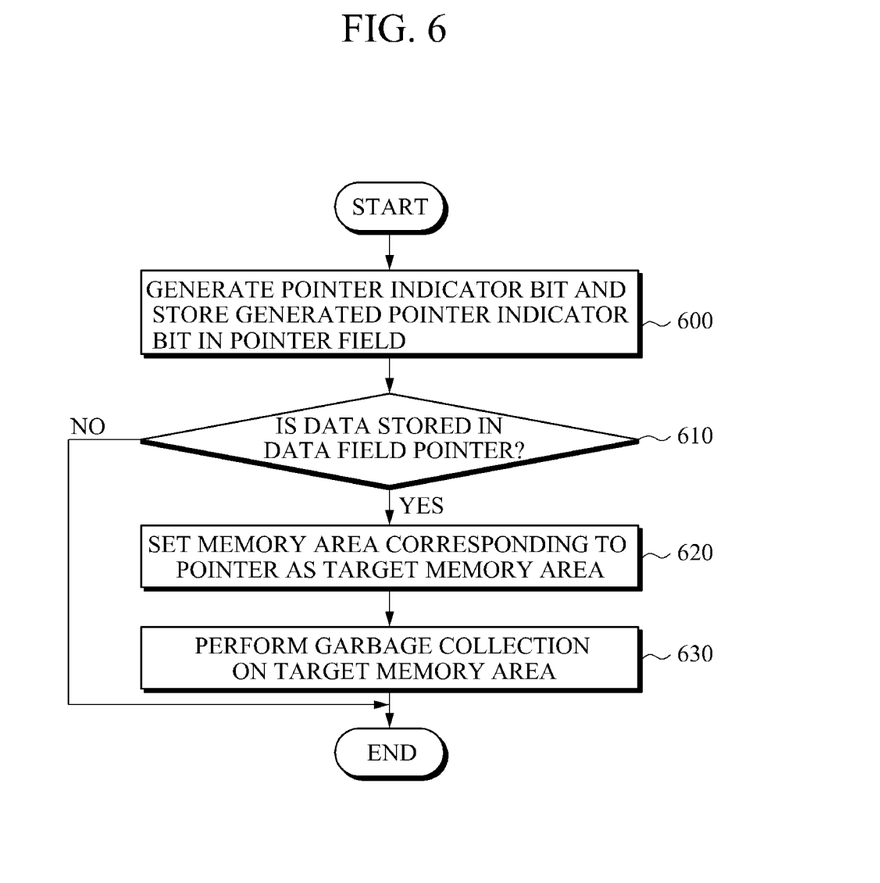
FIG. 6 is a flowchart illustrating an example of a memory managing method.

FIG. 6 illustrates a flowchart of an example of a memory managing method. Referring to the examples illustrated in FIGS. 1 and 6, the memory managing apparatus 100 may generate a pointer indicator bit, and may store the generated pointer indicator bit in a pointer field at operation 600. For example, the memory managing apparatus 100 may determine output data as a pointer if at least one of two pieces of data stored in data fields is a pointer and an operation is performed on the two pieces of data to generate single output data. In addition, the memory managing apparatus 100 may generate the pointer indicator bit to indicate whether the output data is a pointer. As another example, the memory managing apparatus 100 may generate the pointer indicator bit based on an instruction involved with a pointer. The instruction may be at least one of an instruction which directs the memory managing apparatus 100 to read data to be set as a pointer and store the read data in a data field and an instruction which directs the memory managing apparatus 100 to set data stored in the data field as a pointer.

The memory managing apparatus 100 may determine a target memory area on which garbage collection is to be performed, based on the pointer indicator bit. For example, the memory managing apparatus 100 may determine whether the data stored in the data field is a pointer based on the pointer indicator bit at operation 610. If the stored data is a pointer, the memory managing apparatus 100 may set the memory area corresponding to the pointer as the target memory area at operation 620. The memory managing apparatus 100 may perform garbage collection on the target memory area at operation 630.

As another example in which a plurality of pieces of data are stored in the register 110, the memory managing apparatus 100 may extract data that is a pointer from among the plurality of data based on a pointer indicator bit. The memory managing apparatus 100 may determine a memory area corresponding to the extracted data as a target memory area. Then, the memory managing apparatus 100 may perform garbage collection on the target memory area.

The memory managing method shown in the example illustrated in FIG. 6 may more accurately determine, based on a pointer indicator bit, whether the data stored in the register is a pointer, and may determine an exact target memory area on which garbage collection is to be performed.

The examples described above may be fully or partially combined to make various modifications.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory managing apparatus, comprising:
 a register, comprising:
  a pointer field configured to store a pointer indicator bit; and
  a data field configured to store data; and
 a determining unit configured to determine, based on the pointer indicator bit, a target memory area on which garbage collection is to be performed and determine, based on the pointer indicator bit, whether the data stored in the data field is a pointer.

2. The memory managing apparatus of claim 1, wherein the determining unit is further configured to:

in response to the data stored in the data field being a pointer, determine a memory area corresponding to the pointer as the target memory area.

3. The memory managing apparatus of claim 1, further comprising an executing unit configured to perform garbage collection on the target memory area.

4. The memory managing apparatus of claim 3, wherein the executing unit is further configured to:
   determine whether the target memory area is in use; and
   in response to the target memory area not being in use, release allocation of the target memory area.

5. A memory managing apparatus, comprising:
   a register, comprising:
      a pointer field configured to store a pointer indicator bit; and
      a data field configured to store data; and
   a generating unit configured to:
      generate the pointer indicator bit to be used to determine whether the data stored in the data field is a pointer; and
      store the generated pointer indicator bit in the pointer field.

6. The memory managing apparatus of claim 5, wherein, in response to at least one of two pieces of data being a pointer and an operation being performed on the two pieces of data to generate a single piece of output data, the generating unit is further configured to determine the output data as a pointer.

7. The memory managing apparatus of claim 6, wherein the generating unit is further configured to generate a pointer indicator bit to indicate that the output data is a pointer.

8. The memory managing apparatus of claim 5, wherein the generating unit is further configured to generate the pointer indicator bit based on an instruction for setting a pointer.

9. The memory managing apparatus of claim 8, wherein the instruction comprises at least one of:
   an instruction for reading data to be set as a pointer and storing the read data in the data field; and
   an instruction for setting the data stored in the data field as a pointer.

10. A memory managing method, comprising:
    generating a pointer indicator bit;
    storing the generated pointer indicator bit in a pointer field; and
    determining, based on the pointer indicator bit, a target memory area on which garbage collection is to be performed, wherein the determining of the target memory area comprises determining based on the pointer indicator bit, whether the data stored in the data field is a pointer.

11. The memory managing method of claim 10, wherein the generating and storing of the generated pointer indicator bit comprises
    in response to at least one of two pieces of data being a pointer and an operation being performed on the two pieces of data to generate a single piece of output data, determining the output data as being a pointer, and
    generating the pointer indicator bit to indicate that the output data is a pointer.

12. The memory managing method of claim 10, wherein the generating and storing of the generated pointer indicator bit comprises generating the pointer indicator bit based on an instruction for setting a pointer.

13. The memory managing method of claim 12, wherein the instruction comprises at least one of:
    an instruction for reading data to be set as a pointer and storing the read data in the data field; and
    an instruction for setting the data stored in the data field as a pointer.

14. The memory managing method of claim 10, wherein the determining of the target memory area comprises:
    in response to the stored data being a pointer, setting a memory area corresponding to the pointer as the target memory area.

15. The memory managing method of claim 10, further comprising performing garbage collection on the target memory area.

16. A computer-readable information storage medium storing a program for causing a computer to implement the method of claim 10.

* * * * *